Dec. 7, 1965                L. A. COHEN                3,221,419
APPARATUS FOR PRODUCING LINEAR ACCELERATION OF A MASS
Filed Dec. 24, 1963                           3 Sheets-Sheet 2
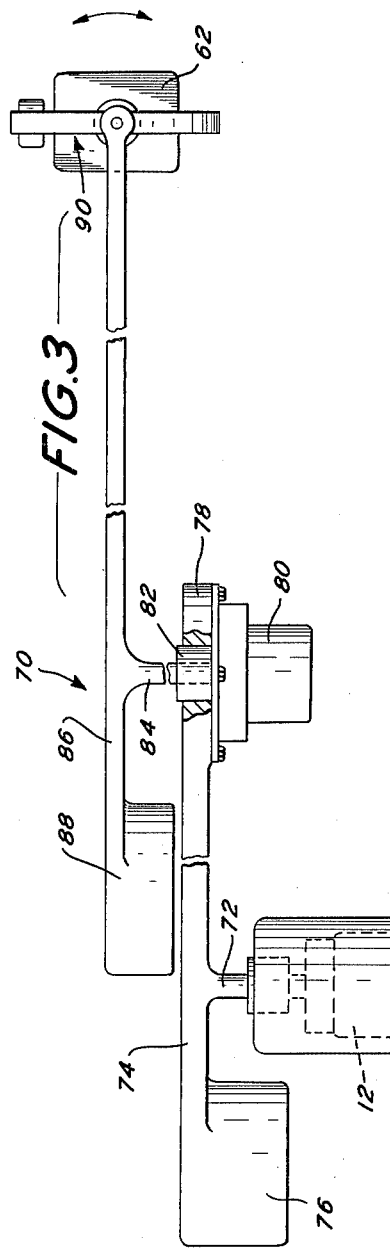
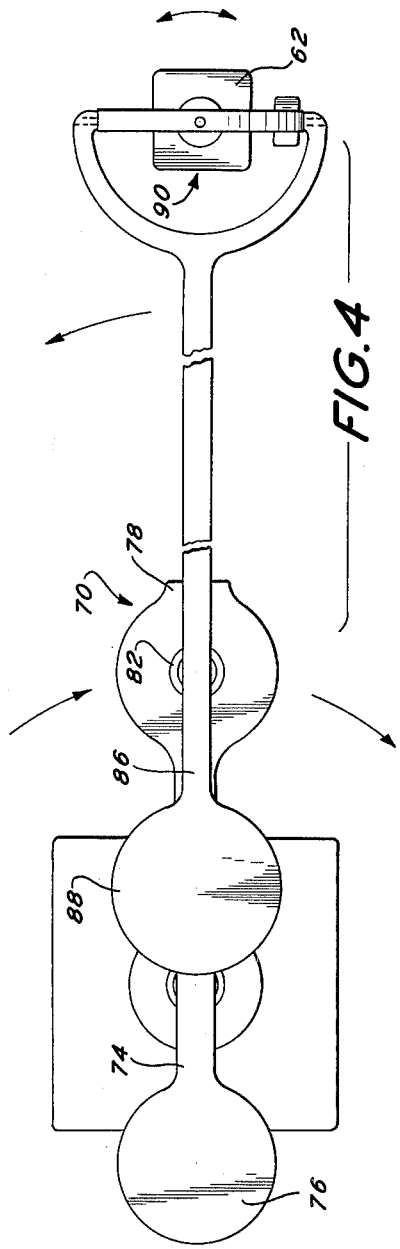
INVENTOR.
LEONARD A. COHEN
BY *Arthur H. Seidel*
ATTORNEY Dec. 7, 1965        L. A. COHEN        3,221,419
APPARATUS FOR PRODUCING LINEAR ACCELERATION OF A MASS
Filed Dec. 24, 1963        3 Sheets-Sheet 3
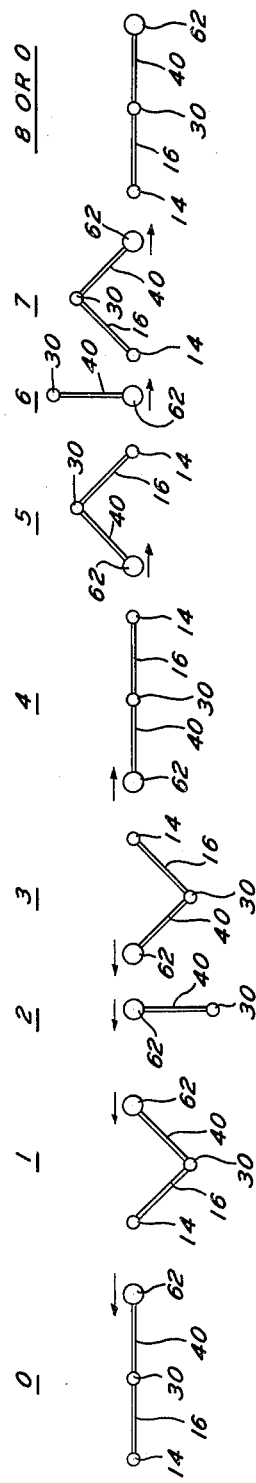
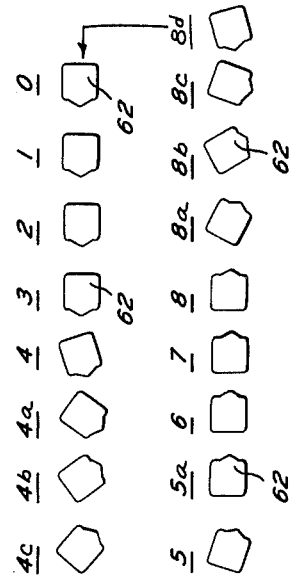
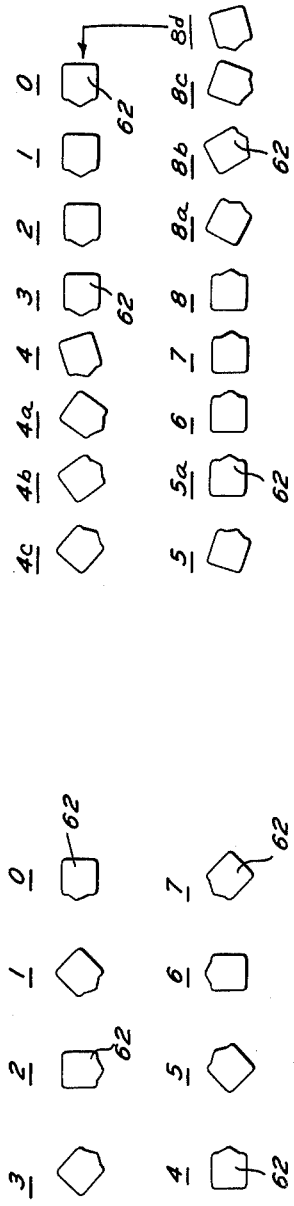
INVENTOR.
LEONARD A. COHEN
BY Arthur H. Seidel
ATTORNEY

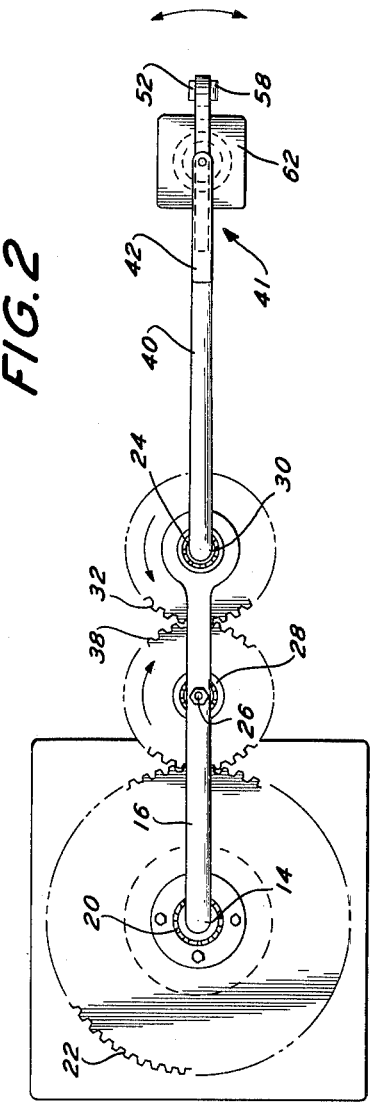

United States Patent Office 3,221,419
Patented Dec. 7, 1965

3,221,419
APPARATUS FOR PRODUCING LINEAR
ACCELERATION OF A MASS
Leonard A. Cohen, 224 Old Lancaster Road, Merion, Pa.
Filed Dec. 24, 1963, Ser. No. 333,098
11 Claims. (Cl. 35—12)

This invention primarily relates to apparatus for imparting true linear acceleration to a mass or particle.

More specifically, the apparatus to be disclosed herein is especially useful for simulating space flight environmental conditions. It has become absolutely essential to be able to simulate linear acceleration conditions in space. Ground based simulation apparatus has heretofore failed in obtaining this objective. This is due to the fact that when a particle or mass is moving along a path which is also in motion the absolute linear acceleration of this particle or mass is the vector sum of:

(a) The acceleration which the particle or mass would have if the path were fixed and the particle moved only along the path;

(b) The acceleration which the particle or mass would have if the particle or mass were fixed to the path and the path moved; and (c) A compound supplementary acceleration called Coriolis' acceleration which is equal to twice the product of the velocity of the particle or mass relative to the path and the angular velocity of the path.

Therefore, apparatus which is ground based must compensate for this supplementary or Coriolis' acceleration in order to obtain an accurate determination of true linear acceleration in space. Any ground based apparatus is subject to Coriolis' acceleration since the apparatus moves along a path on the earth which also is in motion.

Accordingly, it is the primary object of this invention to disclose ground based apparatus for simulating true linear acceleration by minimizing any Coriolis' effect upon a particle or mass carried by the apparatus.

A more specific object of this invention resides in the disclosure of apparatus including a passenger gondola mounted at the end of a pair of relatively rotating arms. Mechanism is provided for rotating these arms in opposite directions to each other so that their net effect will be the reciprocation of the gondola in a true straight linear acceleration pattern.

A still further object of this invention resides in the mounting of the passenger gondola on a gimbal ring arrangement whereby the passenger carried within the gondola can always face essentially in the direction of major linear acceleration.

Yet another object of this invention resides in the disclosure of apparatus wherein the passenger gondola may be rotated at the end of each linear acceleration excursion to offset the peak "change of direction" force occurring at the end of each of said excursions.

A still further object of this invention resides in the fact that by using the apparatus of the present invention all true linear acceleration studies can be conducted in a relatively small confined physical area.

For the purpose of illustrating the invention, there is shown in the drawings a form which is presently preferred; it being understood, however, that this invention is not limited to the precise arrangements and instrumentalities shown.

FIGURE 1 is a side view in elevation of a preferred form of the apparatus used in the present invention with certain portions broken away and shown in section for the purpose of clarity of illustration.

FIGURE 2 is a top plan view of the apparatus shown in FIGURE 1.

FIGURE 3 is a side view in elevation of a slightly modified form of the apparatus of the present invention.

FIGURE 4 is a top plan view of the apparatus depicted in FIGURE 3.

FIGURE 5 is a schematic representation illustrating the resultant motion imparted to a gondola mounted at the end of the apparatus depicted in FIGURES 2 and 4.

FIGURE 6 is a schematic representation of the various rotative positions of the gondola during its linear excursion corresponding to the positions illustrated in FIGURE 5 if the gondola rotation about its own vertical axis is not controlled.

FIGURE 7 is a schematic illustration similar to FIGURE 6 but illustrating the various positions of the gondola when the rotation of the gondola is controlled during its linear excursion by its vertical axis motor.

Referring now to the drawings in detail, a preferred embodiment of the invention is generally designated by the numeral 10. The apparatus 10 comprises a single motor 12 having a shaft 14 connected to a primary rotation arm 16. The shaft 14 and the arm 16 may be integral as shown or rigidly connected by any suitable means. The arm 16 terminates in a ring supporting a free rotation bearing 24 which acts as a journal for a secondary rotation shaft 30. A secondary rotation arm 40 is connected to the secondary rotation shaft 30. The arm 40 may be integral with the shaft 30 as shown or may be rigidly connected thereto in any suitable manner.

The arms 16 and 40 are adapted to be rotated in opposite directions. In order to accomplish this, a stationary gear 22 is mounted in any convenient location such as at the top of the motor frame 18. The shaft 14 is journalled for rotation about the axis of the gear 22 by means of a free rotation bearing 20 secured concentrically to the gear 22. Depending from the primary rotation arm 16 is a shaft 26 to which is coupled a free rotation bearing 28. Journalled upon the bearing 28 is an intermediate gear 38 which is meshed with the stationary gear 22. Mounted upon the secondary rotation shaft 30 is a third gear 32. Gear 32 is rigidly secured to the shaft 30 by a suitable fastening element such as indicated at 36 and is meshed with intermediate gear 38.

It should thus be apparent that upon rotation of the motor shaft 14, the arm 16 will be rotated. The intermediate gear 38 carried by the arm 16, because of its meshing engagement with the stationary gear 22, will be caused to rotate about the free rotation bearing 28. The rotary motion of the gear 38 will be transmitted to the gear 32 which is in mesh with it. The gear 32 will rotate in a direction opposite to the direction of rotation of the gear 38. The gear 38 rotates in the same angular direction as the arm 16 is rotated. Therefore the gear 32 will rotate in an opposite direction from the arm 16 and since it is rigidly secured to the shaft 30 and secondary rotation arm 40, the arm 40 will be caused to rotate in a direction opposite to the rotation of the arm 16.

The arm 40 terminates in a yoke 41 having furcations 42 and 44. The furcation 44 terminates in a support 46 for a motor 48. The furcation 42 terminates in a free rotation bearing 54. Rigidly secured to the shaft 50 of the motor 48 is a gimbal ring 52. The ring 52 is journalled at a point diametrically opposite from its connection to the shaft 50 to the free rotation bearing 54.

A mass such as a gondola 62 for supporting a passenger or other specimen is secured within the ring 52. The gondola is mounted for rotational movement about a horizontal axis by means of a shaft 56 connected to the ring 52. Shaft 56 is journalled within a free rotation bearing 57 secured to the gondola 62. The motor 58 is secured to the ring 52 at a diametrically opposite point to the shaft 56 and includes a shaft 60 attached to the gondola 62. Therefore, the gondola 62 is supported at the end of the secondary rotational arm 40 by a gimbal ring arrangement whereby it may be rotated either around a horizontal or vertical axis by mere actuation of either the motors 48 or 58. It should also be noted that the gondola may thus be rotated by means independent of the rotation arms 16 and 40.

FIGURE 5 illustrates the corresponding position of the rotation arms 16 and 40 at stages of ⅛ revolution of the primary rotation shaft 14. It will be observed that with the arm 16 rotating in a clockwise direction and the arm 40 rotating in a counterclockwise direction, and by using the correct gear ratios between the gears 22, 38 and 32, the gondola 62 can be made to move linearly to the left as viewed in FIGURE 5 until it reaches a point wherein it is diametrically opposite its starting position. A gear ratio between gears 22, 38 and 32 which has been found to produce this motion is 2:2:1. This is illustrated at the ⅘ revolution point of the primary rotation shaft. After this position is assumed, the movement of the gondola will be reversed and it will move linearly to the right as viewed in said figure until it assumes the starting position once again.

Therefore, the net result of the counter rotating shafts is that the gondola will move back and forth in a straight line linear acceleration pattern.

Further, by the use of the motors 48 and 58 to rotate the gondola independent of the rotation of the arms 16 and 40, any combination or variety of periodic rotations of the gondola at the end of or during its linear excursion can be effected. For example, the apparatus may be operated so that the passenger within the gondola 62 is always facing essentially in the direction of major linear acceleration. More specific attention is directed to FIGURE 6 wherein the gondola 62 is represented schematically as facing to the left initially. The eight schematic positions illustrated correspond to the positions of the gondola at ⅛ revolution stages of the primary rotation shaft 14 when there is no rotation of the gondola by either of the motors 48 and 58. Due to the relative rotation of the arms 16 and 40, the gondola will assume the eight rotative positions about its vertical axis as illustrated during the linear excursion of the gondola. However, the motor 48 may be actuated to control rotation of the gondola around its vertical axis so as to prevent any gondola rotation and therefore passenger rotation during most of the linear acceleration excursion. This result is schematically depicted in FIGURE 7. However, as the gondola nears the end of its linear acceleration excursion, the motor 48 may be automatically controlled, either by electrical contacts placed along the linear acceleration track or, if desired, by a computer program and control system so that the gondola is rotated to a position as illustrated at numeral 4 and numeral 8a, just prior to reaching the very end of the linear acceleration excursion.

Once again, the numerals in FIGURE 7 illustrate positions of the gondola at ⅛ revolution stages of the primary rotation shaft 14. As the gondola is continued in the linear acceleration pattern in the opposite direction, the gondola rotation will be completed as illustrated at 5a almost immediately after the new linear acceleration commences. Thus, by the use of the gimbal arrangement at the end of the secondary rotation arm 40, a passenger in the gondola 62 may be maintained in the same position in relation to the direction of linear acceleration during almost the entire linear acceleration excursion. Also, the inertia and centrifugal forces produced by rotation of the passenger and gondola near the end of each linear acceleration excursion will tend to offset the peak "change of direction" force occurring at the end of each linear acceleration excursion.

In the illustrated embodiment in FIGURES 1 and 2 the distance between the axis of rotation of shaft 14 and shaft 30 equals the distance between the axis of rotation of shaft 30 and the shaft of motor 48.

It should thus be apparent that I have disclosed apparatus which will simulate true linear acceleration. By moving a mass linearly while rotating its supporting arm about a changing center, I have in essence fixed the path on which the particle or mass moves by rotating it relative to the rotation of the earth. This is due to the fact that the particle or mass and the earth are both rotating while the particle or mass only moves linearly. The net effect of this motion is to obtain true linear acceleration, since the path is substantially fixed and the angular velocity of the path will be substantially zero whereby the Coriolis' component of the acceleration will be substantially eliminated. This result may be obtained, as I have described above, using the proper parameters in the apparatus for obtaining the motion depicted in FIGURE 5.

By the use of the gimbal ring 52, I am also able to have a passenger in gondola 62 subjected to true linear acceleration whereby he is always facing essentially in the direction of major linear acceleration. Therefore, I simulate actual conditions occurring in space ship flight. The "change of direction" forces are also minimized. Further, since my apparatus will produce linear acceleration for an "infinite" time, true linear acceleration can be reproduced for an "infinite" speed.

A second embodiment of the invention is depicted in FIGURES 3 and 4, and is generally designated by the numeral 70. The principle of operation is identical with the embodiment described above except that the primary rotation arm 74 is provided with a motor housing support 78 at one of its remote ends. Coupled to the housing support 78 is a motor 80 having a motor shaft 84 integrally connected to the secondary rotation arm 86. The motor shaft 84 is journalled within a suitable bearing 82 mounted in support 78.

In the operation of the apparatus 70, the motor 12 will be actuated to rotate its motor shaft 72 and the primary rotation arm 74 in a predetermined direction. The motor 80 will also be actuated to rotate its shaft 84 and secondary rotation arm 86 in a direction opposite to the direction of rotation of the arm 74. Therefore, the effect of oppositely rotating arms will be obtained without the use of the gear train used in conjunction with the apparatus 10. By selecting a rotational speed for shaft 84 which is for example, twice the rotational speed of shaft 72, the gondola 62 will be caused to follow the linear acceleration pattern depicted in FIGURE 5. Counter weights 76 and 88 are placed at remote ends of the rotation arms 74 and 86, respectively, to stabilize the apparatus and to compensate for the lack of support resulting from the removal of the gears and their associated bearing surfaces.

The arm 86 terminates in a yoke 90 similar to the yoke 41 and supports a gondola 62 in the same manner. The yoke 90 is mounted upon the arm 86 in a direction perpendicular to the mounting of the yoke 41 upon the arm 40. However, its operation is identically the same as the yoke 41 also, the gimbal ring arrangement is the same.

In this embodiment of FIGURES 3 and 4, the distance between the axis of rotation of shafts 72 and 84 equals the distance between the axis of rotation of shaft 84 and the vertical axis of rotation of the gimbal ring.

If desired, slip rings with appropriate electrical connectors may be placed at any of the rotating interfaces in either embodiment of the invention, so that all rotating motors besides the main motor may be controlled from an external location and measuring and indicating instruments may be connected within the gondola.

As a specific illustration of the operation of the invention, assume that motor 12 rotates the arm 16 at 100 r.p.m. and that the gear ration between gears 22, 38 and 32 is 2:1:1. The gear 38, being connected to arm 16 will rotate about the axis of shaft 14 at 100 r.p.m. Since gear 38 is in mesh with stationary gear 22 and has ½ the num-the number of teeth as gear 22, it will rotate about its own axis at 200 r.p.m. That is, since arm 16 makes 1 revolution, and gear 38 makes two revolutions during the same time interval, it must rotate at 200 r.p.m. Gear 32 having the same number of teeth as gear 38 will also rotate at 200 r.p.m. and hence arm 40 will rotate at twice the speed of arm 16. This is precisely the same effect that will be obtained by operating motor 80 at twice the speed of motor 12 in the embodiment of FIGURES 3 and 4.

With the rotational speed of the secondary rotation arm at twice the rotational speed of the primary rotation arm and these arms rotating in opposite directions, the motion depicted in FIGURE 5 will be obtained. For example, assume that arm 40 does not rotate. If arm 16 were rotated through 90° in a clockwise direction after 2/8 of a revolution of shaft 14, and arm 40 was fixed thereto, it would also rotate through 90° in a clockwise direction. However, arm 40 has rotated through 180° in a counterclockwise direction about the axis of shaft 30. Therefore arm 40 should be swung 180° in a counterclockwise direction about the axis of shaft 30 from its assumed fixed position. It will occupy the position 2 as shown in FIGURE 5. At 4/8 of a revolution of shaft 14, arm 16 has rotated in a clockwise direction through 180°. From this position, assuming arm 40 had been fixed to arm 16, swing arm 40 through 360° in a counterclockwise direction about shaft 30. It will occupy the position 4 in FIGURE 5. This method of following the motion of the gondola 62 will reveal that true linear acceleration of gondola 62 is obtained.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for imparting true linear acceleration to a mass comprising first rotatable means, second rotatable means coupled to said first means and rotatable in a direction opposite to the direction of said first means, said second means having twice the rotational velocity of said first means, said second means supporting a mass, the distance between the rotation axis of said first means and the rotation axis of said second means being equal to the distance between the rotation axis of said second means and said mass, and means for maintaining said mass facing in the direction of said straight line acceleration.

2. Apparatus in accordance with claim 1 wherein said first means includes a first arm rotatable in a predetermined direction and said second means includes a second arm rotatable in an opposite direction, said second arm being freely rotatable on and supported by a portion of said first arm means.

3. Apparatus in accordance with claim 2 including means coupled to said first arm for imparting rotation, and means coupling said rotation imparting means to said second arm means for synchronizing the relative velocities of said first and second arms.

4. Apparatus in accordance with claim 3 wherein said last mentioned coupling means includes a gear train having a gear ratio of 2:1.

5. Apparatus in accordance with claim 3 wherein said last mentioned coupling means includes a portion of said first arm.

6. Apparatus in accordance with claim 2 wherein said means for imparting rotation to said second arm includes a motor supported by said first arm means.

7. Apparatus in accordance with claim 1 wherein said mass is a gondola.

8. Apparatus comprising a mass, means for supporting said mass and imparting substantially true straight line linear acceleration to said mass, said means including a first arm rotatable in a predetermined direction, and a second arm coupled to said first arm and rotatable in an opposite direction at twice the rotational velocity, said mass being supported by said second arm, the distance between the rotation axis of said first arm and the rotation axis of said second arm being equal to the distance between the rotation axis of said second arm and said mass, and means for maintaining said mass constantly facing in the direction of straight line linear acceleration.

9. Apparatus in accordance with claim 8 wherein said maintaining means includes means for selectively rotating said mass through an arc of 180° at the end of each straight line path of movement of said mass.

10. Apparatus in accordance with claim 8 wherein said second arm includes a gimbal supporting said mass for rotation about an axis substantially perpendicular to the direction of straight line movement of said mass, and means for rotating said mass through an arc of approximately 180° adjacent the end of a straight line path of movement.

11. Apparatus comprising a gondola, means for supporting said gondola and imparting substantially true straight line linear acceleration to said gondola, said means including a first arm rotatable in a predetermined direction, a second arm coupled to said first arm and rotatable in an opposite direction at twice the velocity, said gondola being supported at the end of said second arm, said arms being of substantially the same length, and said second arm supporting a device for selectively rotating said gondola through an arc of 180° at the end of each straight line path of movement of said gondola.

References Cited by the Examiner
UNITED STATES PATENTS

| | | | |
|---|---|---|---|
| 2,345,163 | 3/1944 | Vollrath | 74—660 X |
| 3,041,741 | 7/1962 | Barker | 35—12 |
| 3,083,473 | 4/1963 | Luton | 35—12 |
| 3,136,075 | 6/1964 | Brian | 35—12 |

OTHER REFERENCES

"Cardan Gear Mechanisms," pages 66 and 67 of Product Engineering, Sept. 28, 1959. Copy available in 74–52 X.

EUGENE R. CAPOZIO *Primary Examiner.*

LAWRENCE CHARLES, JEROME SCHNALL,
*Examiners.*